United States Patent Office 3,555,745
Patented Jan. 19, 1971

3,555,745
PROCESS FOR GRINDING A CYLINDRICAL ARTICLE
Minol Ueda, Yamato, Japan, assignor to Geigy Chemical Corporation, Ardsley, N.Y., a corporation of New York
Filed Oct. 31, 1967, Ser. No. 679,422
Claims priority, application Japan, Nov. 2, 1966, 41/71,941
Int. Cl. B24b 1/00
U.S. Cl. 51—289       1 Claim

ABSTRACT OF THE DISCLOSURE

A process for grinding or cutting a workpiece into a cylindrical article comprising the steps of rotatably supporting said workpiece at the opposite ends of its axis by spaced, opposed, aligned support means mounted on a machine table that is movably supported on a stationary base support; moving a cup-shaped, wheel-type grinder or cutter attached to a carriage-supported rotational spindle toward a grinding position in which the axis of the cutter is disposed at right angles to and above or below the line connecting the axes of the opposed, aligned support means; and advancing said table in the longitudinal direction of the machine so as to feed the workpiece with a predetermined pitch and a grinding or cutting machine for carrying out said grinding process.

BACKGROUND OF THE INVENTION

There have been proposed various types of grinding and cutting machines for processing works into cylindrical articles having truly circular cross sections. However, since such conventional grinding or cutting machines generally employ wheel-type cutters as cutting tools, such machines can remove only small amounts of materials from work to be ground or cut in a single work-feeding stroke. This is especially true, when workpieces of square or any other polygonal cross section are to be ground or cut into a truly circular cross section article. In such operation a substantial amount of material must be removed from such workpiece and as a consequence, the grinding or cutting efficiency performed on the work by the use of a conventional wheel-type cutter is inevitably very low.

SUMMARY OF THE INVENTION

The present invention relates to a novel and improved grinding or cutting process to grind or cut workpieces from which a substantial amount of material must be removed therefrom in order to obtain an article of truly circular cross section and especially, a process to grind or cut a rigid and fragile workpiece of the type which is hard to grind or cut into an article of truly circular cross section with high efficiency.

A main object of the present invention is to provide a grinding process which utilizes the advanatages obtainable by plain grinding with the use of a cup-shaped wheel-type grinder or cutter in processing a work into a truly circular cross section article so as to provide an increased effective surface to the cutter and in which the work can be processed into a truly circular cross section article with a high degree of precision in a single feeding stroke requiring only a relatively short period of time.

According to the present invention, a cup-shaped wheel-type cutter formed of emery stone or diamond-bonded metal may be selectively employed depending upon the type of a workpiece to be processed or ground. The cutter is so disposed with respect to a workpiece held between a pair of work center abutment pins that the axis of the cutter may lie at right angles to and above or below the line connecting the axes of axially aligned pins or support means. Then, the work is moved from one end toward the other end of the machine at a predetermined feeding pitch while rotating at a low speed whereby the work may be processed into a truly circular cross section article through coarse, moderate and fine grindings or cuttings in succession in only a single feeding stroke.

The above and other objects and attendant advantages of the present invention will be apparent to those skilled in the art from a reading of the following description and claims in conjunction with the accompanying drawings which constitute part of this specification.

BRIEF DESCRIPTION OF THE DRAWINGS

The drawings schematically illustrate a preferred embodiment of grinding or cutting machine constructed in accordance with the present invention and in which.

PREFERRED EMBODIMENT OF THE INVENTION

Figure 1:
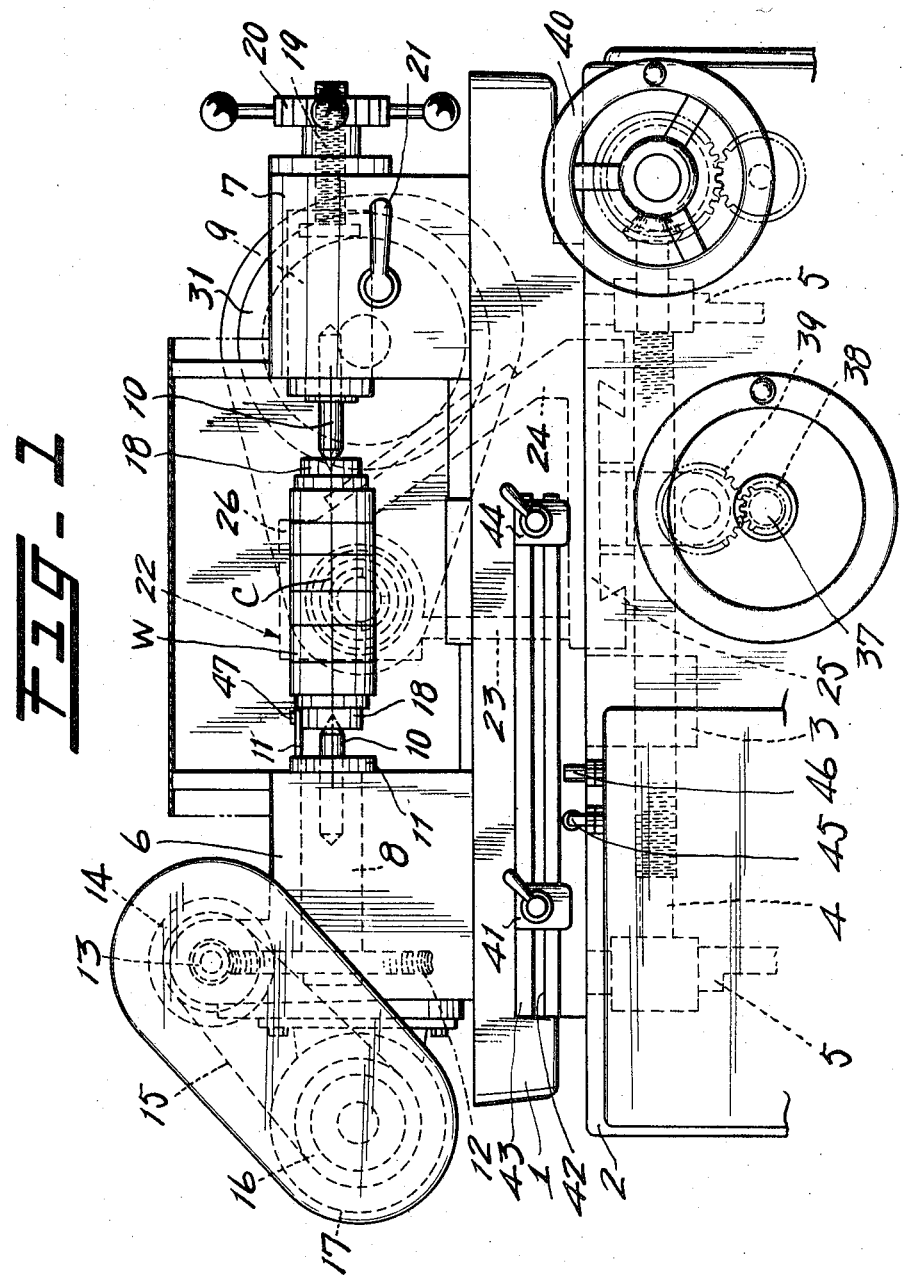
FIG. 1 is a fragmentary side elevational view of said grinding or cutting machine for processing cylindrical workpieces into truly circular cross section articles according to the present invention with some parts thereof removed therefrom.

The present invention will now be described referring to the accompanying drawings in which one preferred form of grinding or cutting machine according to the present invention is illustrated. The novel grinding or cutting machine generally comprises a conventional machine table 1 which is movably mounted on a stationary base support 2 which is in turn supported on the floor of a workshop where the grinding or cutting machine is installed. The machine table 1 carries at a point between its opposite ends an internally threaded annular guide member 3 which extends downwardly and vertically from the bottom of the table through an elongated opening or slot (not shown) formed in the base support 2 and the annular guide member is in threaded engagement with a lead screw 4 which extends longitudinaly in parallelism with and spaced beneath the bottom of the machine table 1. The lead screw 4 is suitably journalled in a pair of spaced support legs 5 which are in turn supported in a suitable conventional manner and extend downwardly and vertically from the base support 2. Therefore, the machine table 1 and parts mounted thereon may be moved in the longitudinal direction of the machine relative to the base support 2 as the annular guide member 3 is threadably moved along the lead screw 4 by a suitable drive mechanism to be described hereinbelow. The machine table 1 mounts at points adjacent to its opposite ends a pair of opposed and spaced support blocks 6 and 7. The support block 6 rotatably supports a cylindrical main or drive shaft 8 in a longitudinal opening extending through such support block; while the support block 7 adjustably receives a cylindrical work center abutment pin support member 9 in a longitudinal opening extending therethrough. The diameter of said opening in the support block 7 being reduced at its outer end for the purpose to be described hereinbelow. The main or drive shaft 8 is provided in its center with a bore extending from one end (the inner end as shown in FIG. 1) to be substantially mid point of its length for snugly receiving a work center abutment pin 10 having one pointed end thereon. As more clearly shown in FIG. 1, the length of the main shaft opening is shorter than that of the abutment pin 10 and accordingly, the pointed end of the pin projects beyond the adjacent exposed end of the main shaft 8. The exposed end of the shaft 8 has a fixture 11 which secures the pin 10 to the shaft. The fixture 11 has a lateral engaging projection 11' for the purpose to be described hereinbelow. The other end of the main or drive shaft 8 has a worm wheel 12 fixedly secured thereto and the worm wheel meshes with a worm 13 which is disposed above and at right angles to the main shaft 8. The worm 13 has a pulley 14 secured thereto and an endless belt 15 is trained over the pulley 14 and over another pulley 16 mounted on the output shaft of an electric motor 17 extending in a plane below and parallel to the worm 13 whereby the main or drive shaft 8 may be rotated at a rate lower than that of the motor by the motor through the transmission arrangement referred to just above.

The cylindrical work center abutment pin support member 9 is provided in the center with a bore having a length shorter than the associated pin 10' and extending from one end (the inner end as shown in FIG. 1) toward the other or outer end by a distance for snugly receiving such work center abutment pin 10' which also has one pointed end. The pointed end of the work center abutment pin 10' also projects beyond the adjacent end of the pin support member 9 in the same manner as in the case of the pin 10 associated with the main shaft 8. The two pins 10 and 10' are supported by their respectively associated main shaft 8 and pin support member 9 in such a manner that the axes of the two pins may be disposed in aligned relation to each other. The other or outer end portion of the pin support member 9 is of reduced size and externally threaded as indicated by reference numeral 19 in FIG. 1 and has such length as to extend beyond the adjacent end of the support block 7. This reduced end is in threaded engagement with an internal thread formed in the reduced diameter opening of the outer portion of the support block 7. The reduced end of support member 10 threadably receives at its extreme end a manual adjusting handle 20 whereby the support member 9 may be advanced or retracted within the support block 7 by turning the adjusting handle 20 in one direction or the other direction depending upon the length of a work to be processed so as to advance or retract the work center abutment pin 10 associated therewith toward or away from the opposite center abutment pin 10 resulting in decreasing or increasing the distance between the two pins 10 and 10'. In this way, the grinding or cutting machine can accommodate workpieces having various different lengths. To accomplish this the work center abutment pin support member 9 is moved to a predetermined position by manipulation of the manual handle 20 or more particularly, a predetermined distance is established between the opposed center abutment pins 10 and 10'. Then a clamping member 21, which is provided on one side of the support block 7 and has an externally threaded portion threadably received in a threaded bore formed in the side of such support block and in integral grip portion disposed outside of the support block, is turned in the tightening direction so as to drive the threaded portion against the work center abutment pin support member 9 to set this member and accordingly, the abutment pin 10' supported thereby in the adjusted position.

Figure 3:
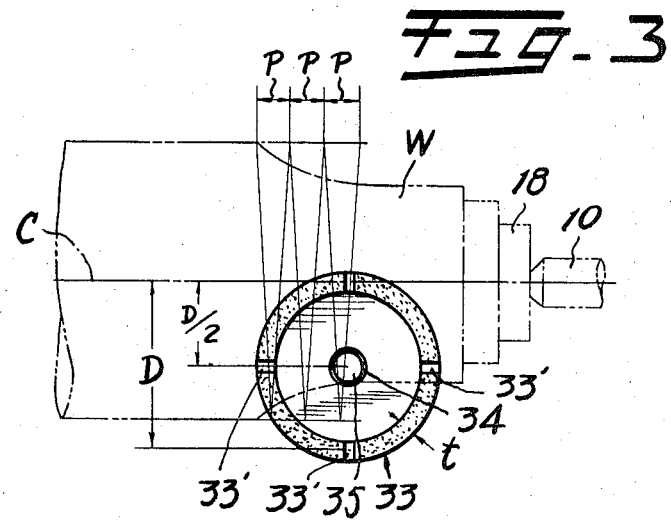
FIG. 3 is a diagrammatic view illustrating the manner by which the novel grinding process is performed on said machine.
Figure 4:
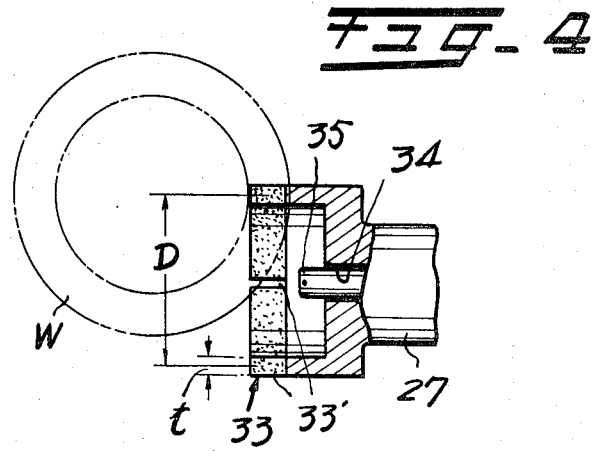
FIG. 4 is a diagrammatic side elevational view of FIG. 3.

A slidable spindle carriage 22 is mounted on the base support 2 laterally spaced from and adjacent to the table 1 at right angles to the center line C connecting the axes of the opposed work center abutment pins 10 and 10' and the carriage is so mounted on the base support 2 that the carriage may threadably move toward and away from a workpiece W to be processed which will be held between the opposite work center abutment pins 10 and 10' in the manner which will be in detail described hereinbelow. The spindle carriage 22 substantially comprises a pair of laterally spaced upright leg portions 23 (only one of them is shown in FIG. 1), a pair of downwardly and outwardly inclined leg portions 24 (only one of them is shown in FIG. 1) and a horizontal base portion or slide connecting between the upright and inclined leg portions 23 and 24 at their lower ends. The base portion or slide 25 extends downwardly through a transverse opening or slot (not shown) in the base support 2. The upper ends of the upright and inclined leg portions 23 and 24 converge into an enlarged spindle support portion 26 which is provided with a through opening for rotationally receiving a spindle 27. One end or the outer end of the spindle 27 projects beyond the adjacent end of the spindle support portion 26 of the carriage 22 and has a pulley 28 secured thereto. An endless belt 29 is trained over the pulley 28 and also over a pulley 30 secured to one end of the output shaft 32 of an electric motor 31 whereby the spindle is rotated by the motor 31 through the pulley and belt type-transmission arrangement 28, 29 and 30. The other end or inner end of the spindle 27 also projects beyond the adjacent end of the spindle support portion 26 of the carriage 22 and has a cup-shaped wheel-type cutter 33 attached thereto by a conventional manner. The height of the spindle receiving opening in the spindle support portion 26 of the carriage 22 above the base support 2 and accordingly, the height of the spindle 27 above the base support 2 is so selected that the rotational axis of the cup-shaped wheel-type cutter 33 may be positioned at a point above or below the line C connecting the axes of the axially aligned, opposed work center abutment pins 10 and 10' by a distance corresponding to one-half of the effective diameter D of the cutter. In FIGS. 3 and 4 the axis of the cutter 33 is shown as being disposed below the center line C. Likewise as shown in FIGS. 3 and 4 the spindle 27 is provided with a center bore 34 for receiving a coolant spray nozzle 35 therein and the coolant spray nozzle is adapted to be supplied with coolant from a suitable supply source (not shown) and spray the coolant into the interior of the cup-shaped wheel-type cutter 33.

For moving the carriage 22 and accordingly, the spindle 27 having the cutter 33 secured thereto toward and away from the workpiece W so that the amount of material to be removed from the work W by the cutter 33 may be controlled or adjusted as desired, a manual handle 36 is provided on one side of the base support 2 and the shaft 38 of the handle has a suitable worm gear 38 secured thereto. The worm gear 38 is in engagement with a worm 39 suitably supported by suitable support arms (only one of them is shown in dotted lines in FIG. 1) which extend downwardly through the above-mentioned transverse slot or opening formed in the base support 2 through which the base portion or slide 25 of the carriage 22 extends. For moving the machine table 2 in the work feeding direction (from left to right in FIGS. 1 and 2), a feed handle 40 is provided on the same side of the base support 2 as the handle 36. Handle 40 is mounted at one end portion of the support 2 slightly above and laterally spaced from the handle 36. The handle 40 is connected through a conventional gear train to the lead screw 4 and is adapted to be manually or automatically rotated by operation of a suitable conventional change-over clutch (not shown). An adjustable microswitch actuating piece 41 is adjustably received in an elongated horizontal groove 42 defined by a pair of elongated plate members 43 and 43 suitably secured to one side of the machine table 2 and extending horizontally along the table side. An adjustable table stopper actuating piece 44 is also received in the groove 42 laterally spaced from the piece 41. The positions of these pieces 41 and 44 may be varied along the groove 42 depending upon the length of a work W to be processed. A microswitch 45 is provided on the same side of the base support 2, as the handles 36 and 40, and projects above the surface of the base support 2 to be actuated by the microswitch actuating piece 41. A table stopper or abutment 46 is also provided on the side of the base support 2, as the microswitch 45. The stopper 46 is laterally spaced from the switch 45. The above-mentioned workpiece W to be processed may have a cylindrical, square or any other polygonal cross section and prior to being mounted between the opposed work center abutment pins 10, 10', the work W has firmly attached thereto a pair of conventional attachments 18, mounted at the opposite ends thereof in a suitable conventional manner. The attachments 18 are respectively provided in the center on the outer end with a small conical bore (not shown) the configuration of which is substantially corresponding to that of the projecting pointed ends of the work center abutment pins 10, 10'. One of the pair of attachments 18 (the attachment adjacent to the main or drive shaft 8 in the illustrated embodiment) is provided at a suitable point of its periphery with a laterally extending engaging piece 47 adapted to engage cooperating engaging piece 11' on the main shaft 8 whereby the rotational movement of the main shaft 8 may be transmitted through the cooperating engaging pieces 11' and 47 to the work W.

In FIGS. 3 and 4, D denotes the effective diameter of the cutter 33, $p$ is the work feeding pitch and $t$ is the wall thickness of the cup-shaped wheel-type cutter 33. In the illustrated embodiment, the cup-shaped wheel cutter 33 is shown as a diamond bonded metal type having a plurality of equally spaced notches 33' in the wall extending from the open end toward the spindle-supported end by a certain distance so that the cutter can be suitably employed for processing fragile works. The material and construction of the cup-shaped wheel-type cutter may be suitably varied depending upon the material of work to be processed and various operation factors within the scope of the invention.

Figure 2:
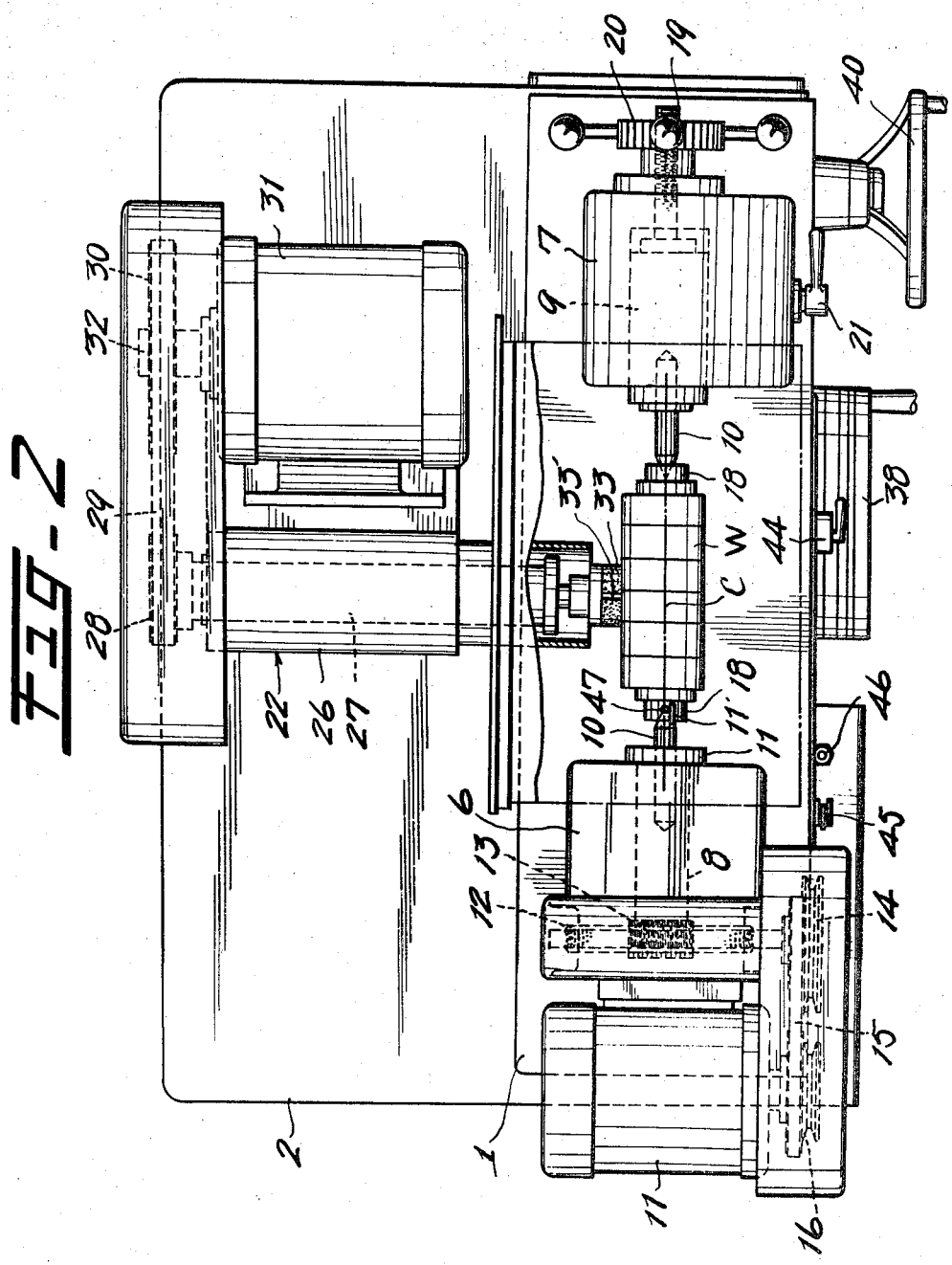
FIG. 2 is a top plan view of said machine with portion thereof broken away.

In operation, prior to positioning the workpiece or work W having the attachments 18 firmly attached to its opposite ends between the opposite work center abutment pins 10, 10', the clamping member 21 is loosened so as to allow the pin support member 9 to be moved within the support block 7 with respect to the other pin 10. Then the manual handle 20 is turned in either direction so that the pin support member 9 and accordingly, the work center abutment pin 10' supported thereby may be advanced toward and away from the opposing pin 10 supported by the main shaft 8 depending upon the length of the work W so as to obtain a desired distance between the opposing work center abutment pins 10, 10'. The initial distance or space to be obtained in this way is preferably such a degree sufficient to accommodate the work W therebetween so that the work may be easily positioned in the space. Thereafter, the attachment 18 having the projection 47 is first fitted on the point end of the adjacent work center abutment pin 10 by means of the conical bore in the attachment and then the pin support member 9 and work center abutment pin 10' supported thereby is advanced toward the now unsupported end of the work W by suitably manipulating the handle 20 until the pointed end of the pin 10' fully enters the mating center bore in the adjacent attachment 18 while the work W is being manually held in the horizontal position. After the pointed end of the right-hand side center abutment pin 10' has fully entered the mating conical bore in the adjacent attachment 18, the clamping member 21 is tightened so as to set the support member 9 in the position in which the member 9 now assumes. In this way, the grinding machine is ready for a grinding or cutting operation on the work W. Then, the adjusting handle 40 is manually manipulated so as to move the machine table 1 having the work W supported thereon in the above-mentioned manner in the left direction (as seen in FIGS. 1 and 2) relative to the base support 2 until the work W is displaced from such a position in which the work may stand in the way of the spindle carriage 22 which will be moved toward or away from the work W by the handle 36 in determining the proper grinding or cutting position of the cutter 33. After the cutter 33 has been moved to the proper grinding position in which the cutter 33 will contact the work W in such a relation that the cutter can remove the material of the work W by a predetermined amount, the motor 18 is actuated and the thus actuated motor rotates the main shaft 8 through the transmission mechanism including the pulley 16, endless belt 15, pulley 14, worm 13 and gear 12. The rotational movement of the main shaft 8 is then transmitted through the cooperating engaging pieces 11' and 47 on the main shaft 8 and adjacent attachment 18 to the work W and the work is rotated about its axis. As soon as the motor 31 is actuated so as to rotate the spindle 27 within the spindle support portion 26 of the carriage 22 through the motor shaft 32, and pulley and belt arrangement 28, 29 and 30, the cutter 33 secured to the spindle at the inner end thereof is rotated, then coolant is allowed to pass through the nozzle 35 by manipulation of a conventional valving means associated therewith (not shown) and is sprayed against the inner periphery of the cutter 33. At the same time, the clutch associated with the handle 40 is changed over so as to automatically rotate the lead screw 4 through the associated gear train whereby the machine table 1 is moved in the right hand direction as seen in FIGS 1 and 2. The moving rate of the machine table 1 during the grinding operation is so selected that the table may feed the work W at a feeding pitch corresponding to or twice as much as the wall thickness $t$ of the cup-shaped wheel-type cutter 33 per complete revolution of the main shaft 8.

As the machine table 1 and accordingly, the work W supported thereby is axially moved or fed in the manner as mentioned above and gradually ground off, the grinding is initiated on the right end portion in such a manner that when a leading section on the work W, where the rotating cutter 33 first contacts the work, is first coarsely ground or cut, then, moderately ground or cut and then finely ground or cut per revolution of the work W. The finely ground section has a desired final diameter having a truly circular cross section. Thereafter, the finely ground or cut leading section passes the grinding position and at the same time a section immediately following the ground leading section is presented to the grinding position and ground or cut in the manner as mentioned in connection with the leading section. The above-mentioned grinding or cutting procedure is repeated until all the sections of the work W are perfectly processed. In the illustrated embodiment, every time each section of the work W passes the cutter 33 by a slight distance the section is perfectly processed. The coarse grinding or cutting is performed at a point several pitches short of the fine grinding or cutting position and the moderate grinding or cutting is performed at a point one pitch short of the final grinding or cutting position. As soon as the last section of the work W has passed the cutter 33 by the above-mentioned slight distance and the cutter has come out of its contact with the work whereupon the microswitch actuating piece 41 contacts the microswitch 45 to deenergize the drive motor (not shown) for the switch whereby the movement of the table 1 or the feeding of the work W is terminated. When the whole of the work W has been completely processed, the work has a desired truly circular cross section throughout the length. Then, the motor 31 is deenergized so as to stop the rotation of the spindle 27 and accordingly, the cutter 33.

After the work W has been completely processed and the movement of the machine table 1 and spindle 27 has been stopped, the clamping member 21 is loosened so that the work center abutment pin support member 9 and associated pin 10' may be retracted or moved away from the opposing main shaft 8 and associated work center abutment pin 10 supported thereby and they are ready for removal of the completely processed work W together with the attachments 18 secured to the opposite ends thereof. Then, the clutch is changed over so that the handle 40 may be manually operated to manually move or withdraw the machine table 1, by means of cooperation between the annular guide member 3 and lead screw 4, to the initial position where the grinding or cutting operation was initiated. As the table 1 is retreated in the manner mentioned just above, the stopper actuating piece or abutment 44 contacts the stopper or abutment 46 whereupon the movement of the table 1 is stopped.

When the grinding or cutting machine is operated for processing a work W of fragile material, the free end of the diamond-bonded cup-shaped wheel-type cutter 33 is formed as having a flat contacting surface and the machine table 1 is moved at a greater rate and accordingly, the work feeding pitch is made relatively greater so that the cutter may remove the material of the work W by a greater amount resulting in increase of the processing efficiency.

When the work W is formed of metal, since the metal of the work has to be removed in a relatively great amount, instead of the illustrated cutter 33, a cup-shaped wheel-type emery stone is employed and during the grinding or cutting operation the feed pitch of the machine table 1 is maintained no greater than the wall thickness of the emery stone. And when a metallic work is milled by the novel machine, a combination of face and side cutting milling cutter is employed whereby the work, which may be either in the form of a square or any other polygonal bar, can be processed with a high efficiency. However, it should be understood that the cutters which may be suitably used in the present invention have one selected uniform diameter.

As mentioned above, according to the present invention, since the cutter 33 is so positioned that the axis of the cutter extends at right angles to and above or below the center line C which lies in alignment with the axes of the axially aligned opposite work center abutment pins 10 and 10′ and the cutter 33 has a relatively large contact area, even the feed rate of the work W in the axial direction per revolution of the main shaft 5 is made greater during the grinding or cutting operation, thus the formation of spiral traces on the work can be effectively eliminated. Furthermore, since the coarse, moderate and fine grinding or cutting operations on one piece of work can be performed in a single feed stroke, the work can be perfectly processed in a greatly shortened time space. In addition, since the cutter can contact different points of a work at different angles, respectively, the grinding or cutting stress on the work by the cutter is evenly distributed throughout the work and every part of the work bears such stress equally and the adverse effects upon the processing preciseness by the stress can be minimized.

The present disclosure includes that contained in the appended claim as well as that of the foregoing description.

Although this invention has been described in its preferred form with a certain degree of particularity, it is understood that the present disclosure of the preferred form has been made only by way of example and that numerous changes in the details of construction and arrangement of parts may be resorted to without departing from the spirit and the scope of the invention as hereinafter claimed.

What is claimed is:

1. A process for grinding or cutting effecting coarse, moderate and fine grinding operations in a single feed stroke to convert a metallic workpiece into a cylindrical article having a truly circular cross section comprising the steps of rotatably supporting such a workpiece at its opposite ends by a pair of axially aligned opposite support means, supporting a rotary annular grinding cutter in a position such that the axis of such cutter lies at right angles to and is spaced from the line connecting the axes of said axially aligned work support means by a distance corresponding to one-half of the effective diameter of the cutter, moving such rotary cup-shaped wheel-type cutter to a grinding position in which the central position of the effective diameter of said cutter will contact the grinding surface of said workpiece in the grinding direction and in such relation that said cutter can remove material from said workpiece by a predetermined amount, maintaining said cutter in such position, then feeding said workpiece longitudinally of its axis to and past said cutter at a low work feeding pitch no greater than the wall thickness of said cutter, maintaining said workpiece in rotation at a low rate of speed and rotating said cutter at a predetermined high rate of speed in relation to the speed of rotation of said workpiece and in relation to said predetermined low work feeding pitch.

References Cited

UNITED STATES PATENTS

| | | | |
|---|---|---|---|
| 1,467,518 | 9/1923 | Taylor | 51—132 |
| 1,610,768 | 12/1926 | Graham | 51—132X |
| 1,511,842 | 10/1924 | Schmidt | 51—289X |
| 1,511,843 | 10/1924 | Schmidt | 51—289X |
| 2,697,900 | 12/1954 | Lewis | 51—289 |

FOREIGN PATENTS

| | | | |
|---|---|---|---|
| 388,467 | 3/1933 | Great Britain | 51—56 |

HAROLD D. WHITEHEAD, Primary Examiner